United States Patent [19]
Rexroad et al.

[11] 3,804,998
[45] Apr. 16, 1974

[54] DRAW OUT CIRCUIT BREAKER WITH IMPROVED DRAW-IN BOLT CONTACT MOUNTING MEANS

[75] Inventors: James O. Rexroad, Beaver; Louis N. Ricci, Beaver Falls, both of Pa.

[73] Assignee: Westinghouse Electric Corporation, Pittsburgh, Pa.

[22] Filed: Dec. 19, 1972

[21] Appl. No.: 316,635

[52] U.S. Cl.............................. 200/50 AA, 200/166 B
[51] Int. Cl............................................. H01h 33/46
[58] Field of Search.......... 200/50 A, 50 AA, 50 C, 200/166 B

[56] References Cited
UNITED STATES PATENTS

| | | | |
|---|---|---|---|
| 3,440,371 | 4/1969 | Netzel et al.................. | 200/50 AA |
| 3,710,044 | 1/1973 | Sharp............................ | 200/50 AA |
| 3,235,681 | 2/1966 | Pokorny et al................ | 200/50 AA |
| 3,030,463 | 4/1962 | Kozlovic et al............... | 200/50 AA |
| 3,578,925 | 5/1971 | Drown et al.................. | 200/50 AA |
| 3,496,320 | 2/1970 | Wasileski...................... | 200/50 A |

Primary Examiner—James R. Scott
Attorney, Agent, or Firm—L. P. Johns

[57] ABSTRACT

A circuit breaker structure of the draw-out type characterized by a multi-pole circuit breaker which is adapted for quick removal and/or replacement of a circuit breaker having at least two horizontally spaced poles, each pole comprising two vertically spaced incoming and outgoing terminals, and draw-in bolts operative to move the terminals into tight electrical contact with corresponding bus conductor terminals.

6 Claims, 4 Drawing Figures

DRAW OUT CIRCUIT BREAKER WITH IMPROVED DRAW-IN BOLT CONTACT MOUNTING MEANS

CROSS REFERENCE TO RELATED APPLICATION

This invention is related to an invention disclosed in the application of Zelko J. Kruzic and James O. Rexroad, Ser. No. 316,635, filed Dec. 19, 1972.

BACKGROUND OF THE INVENTION

1. Field of the Invention:

This invention relates to switchgear and more particularly to circuit breakers of the draw-out type having spaced bolts for drawing and holding the circuit breaker terminals in tight electrical contact with corresponding bus conductor terminals.

2. Description of the Prior Art

Circuit breakers having larger ratings such as the draw-out type breaker for metal-enclosed switchgear, are provided with multiple connectors on each pole to multiply the number of contacting areas in order to minimize electrical resistance and the resulting heat generated thereby. In the past, various means have been employed for moving or actuating the circuit breakers into and out of operating position with respect to terminals of load and line bus conductors. Disadvantages of the particular type of draw-out devices include difficulty of manipulation and unreasonable cost. For example, one draw-out type of circuit breaker for metal-enclosed switchgear includes a draw-out bolt arrangement comprising four bolts, one at each corner of a mounting frame. That bolt arrangement has been unsatisfactory because during tightening of a particular bolt it was found that binding frequently occurred between the mounting tracks and the track rollers that support the breaker during installation.

SUMMARY OF THE INVENTION

In accordance with this invention, it has been found that the foregoing problems may be overcome by providing a circuit breaker structure having a multi-pole circuit breaker with at least two vertically spaced incoming and outgoing terminals each comprising a plurality of spaced terminal fingers, the terminal fingers being interengageable with corresponding conductor fingers of at least two vertically spaced incoming and outgoing bus conductors, the circuit breaker being mounted on a mounting frame having a pair of spaced mounting bolts for engagement with bolt-receiving members forming part of another frame on which the bus conductor terminals are mounted, the bolts having bolt heads accessible from the front of the circuit breaker, and the bolts being aligned with the direction of movement of the circuit breaker terminals for engagement with the bus conductor terminals.

The advantage of the circuit breaker mounting means of this invention is that it facilitates the mounting of the terminals of the circuit breaker in good electrical contact with corresponding bus conductors and provides a less costly device.

DESCRIPTION OF THE PREFERRED EMBODIMENT

Figure 1:
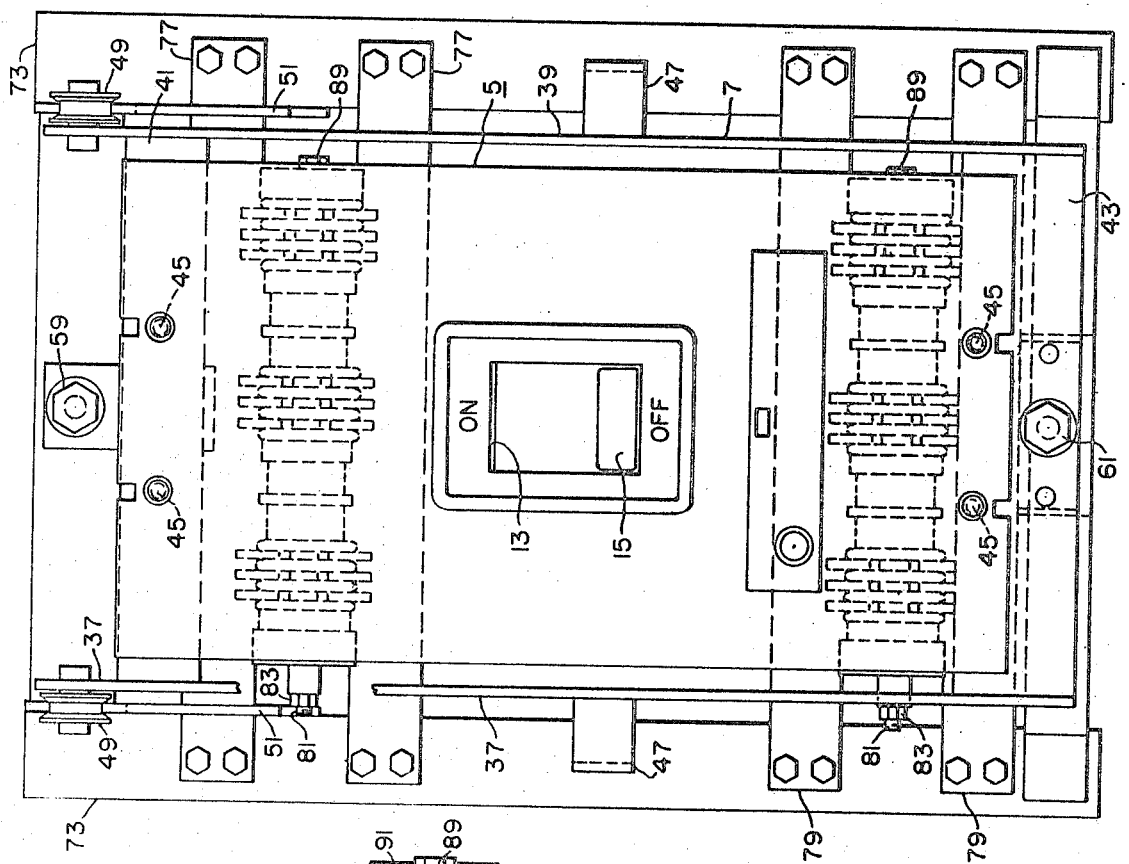
FIG. 1 is a front elevational view of a circuit breaker within a mounting frame.

In FIG. 1, a circuit breaker generally indicated at 5, is shown mounted on a mounting frame 7. As shown more particularly in FIG. 2, the circuit breaker 5 is a large molded-case type of breaker, such as disclosed in Canadian Pat. No. 693,476, issued Sept. 1, 1964 for which reason only a limited description is included herewith. The circuit breaker 5 includes an enclosure comprising a base 9, a removable cover 11, both of which may be molded from suitable insulating material such as a thermosetting resin. The cover 11 includes an opening 13 through which a manually operated handle 15 extends, which handle is shown in the "off" position in FIG. 2.

Figure 2:
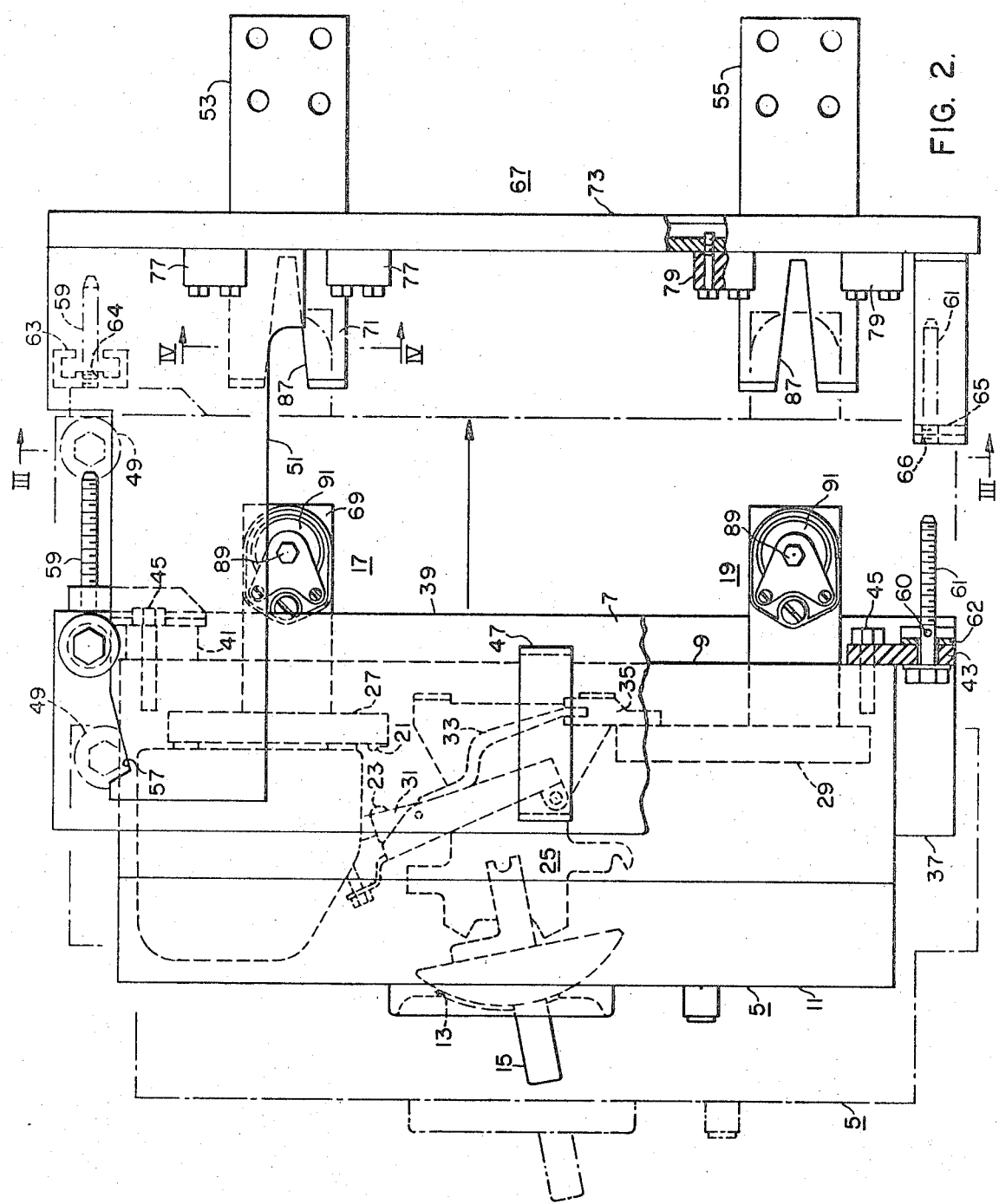
FIG. 2 is a side elevational view, with parts broken away, showing the manner in which the circuit breaker is mounted prior to connection with incoming and outgoing bus conductors.

The circuit breaker is of the three-pole type, each pole being provided with incoming and outgoing terminal structures or terminals indicated generally at 17 and 19 at spaced locations on the base 9. The circuit breaker includes, for each pole unit, a stationary contact 21, and a movable contact 23. A common operating mechanism, indicated generally at 25, is provided for simultaneous actuation of the three movable contacts to open and closed positions of the contacts 21 and 23 upon manual operation of the handle 15. As shown in FIG. 2, the terminal structures 17 and 19 are attached to stationary conductors 27 and 29, respectively, which are secured by suitable means to the base 9. A path of travel of the circuit through the breaker extends from the terminal structure 17 to the conductor 27, the stationary contact 21, the movable contact 23, a contact arm 31, flexible conductors or shunts 33, a conducting strip 35, the conductor 29, and the terminal structure or terminal 19.

The mounting frame 7, as shown in FIGS. 1 and 2, is a rectangular structure including spaced vertical frame members 37 and 39 and horizontal members 41 and 43 which extend between and are attached to the frame members in a suitable manner such as by screws (not shown). The circuit breaker 5 is mounted on the frame by similar screws 45 in the members 41 and 43. The frame includes a pair of similar handles 47 on the opposite frame members 37 and 39 by which the circuit breaker may be lifted into a mounting position. For that purpose, rollers 49 are attached to the upper end of the frame members 37 and 39 which rollers are mounted on similar spaced tracks 51 of a mounting bracket for moving the terminals 17 and 19 into engagement with corresponding bus conductors 53 and 55.

In the retracted position, as shown in FIG. 2, the terminals 17 and 19 are in alignment with, but not in engagement with, the bus conductors 53 and 55. To engage the terminals and conductors, the circuit breaker 5 is moved by rolling the assembly of the circuit breaker and frame along the tracks 51 to the broken line position of the roller 49 in which position the terminals 17 and 19 are in electrical contact with the bus conductors 53 and 55, respectively. For convenience, each track 51 is provided with a notch 57 to prevent the assembly of the circuit breaker 5 and the frame 7 from accidentally rolling off of the end of the track 51. In addition, the frame 7 is provided with upper and lower locking-in or draw-in bolts 59 and 61 which are accessible from the front side of the circuit breaker and which engage bolt-receiving members 63 and 65, respectively, on a bracket 67.

As the assembly of the circuit and frame is rolled to the right as viewed in FIG. 2 to bring the terminals 19 and 17 into contact with the bus conductors 53 and 55, the bolts 59 and 61 come into initial contact with the bolt-receiving members 63 and 65. The member 63 includes an aperture 64 for receiving the bolt 59. Likewise, the member 65 includes an aperture 66 for receiving the lower bolt 61. Further movement of the assembly to the right is accomplished by tightening the bolts 59 and 61 into the respective apertures 64 and 66 until the terminals 17 and 19 are in tight electrical contact with the bus conductors 53, 55. The bolts 59 and 61 are parallel to the direction of movement of the assembly of the circuit breaker and frame. Moreover, the bolts 59 and 61 are substantially centrally disposed between the frame members 37 and 39, whereby binding of the interfitting parts of the terminals and bus conductors is prevented during tightening of the bolts. In that manner, the bolts are used to force the interengaging portions or fingers of the corresponding terminals and bus conductors into solid electrical surface-to-surface contact and alignment.

Conversely, when it is necessary to remove the circuit breaker 5, the bolts 59 and 61 are turned to disengage them from their corresponding apertures 64 and 66. For that purpose both bolts 59 and 61 have a pin 60 (as shown for bolt 61 in FIG. 2) extending through suitable apertures; both pins and apertures are disposed at substantially right angles to the axis of the bolts. Moreover, a wear washer 62 is on each bolt between the pin and bolt head. The pins 60 are necessary to force disengagement of the breakers from the mounting frames. Upon completion of disengagement of the bolts from their apertures the portions of the terminals and bus conductors are completely disengaged and the rollers 49 are moved to the left to the position shown in (FIG. 2). From that position, the assembly of the circuit breaker and frame are rolled further to the left until the rollers 49 are seated in the notches 57 of the tracks 51. Accordingly, the circuit breaker may be engaged or disengaged from the operating position with respect to the bus conductors 53 and 55 without taking power off the bus conductors. Finally, it is noted that the heads of the bolts 59 and 61 are accessible from the front side of the circuit breaker; that is, on the side opposite the bus conductors 53 and 55, so that it is unnecessary for personnel to enter the area behind the circuit breaker where the bus conductors are located in order to connect or disconnect the circuit breaker thereto.

Figure 4:
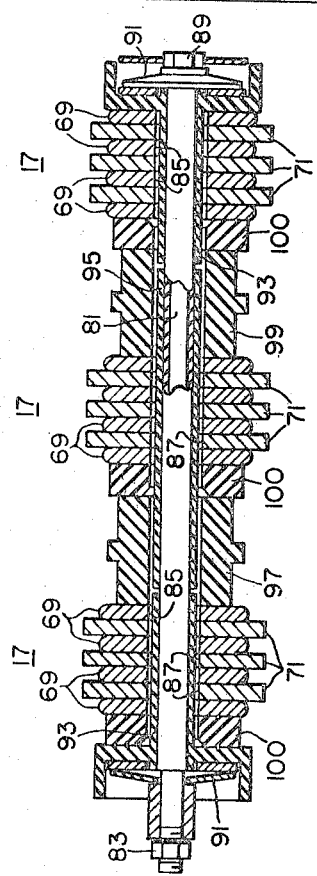
FIG. 4 is a vertical sectional view taken on the line IV—IV of FIG. 2.

As shown in FIG. 4, the terminals 17 for the three poles of the circuit breaker 5 include a plurality of spaced portions or terminal fingers 69 of similar construction which are plate-like members and which extend horizontally from the conductor 29. The terminal fingers 69 have generally planar surfaces and are disposed along generally vertical planes. The spacing between the several fingers 69 is substantially equal to the thickness of conductor fingers 71 of the bus conductor 53, so that when the terminals 17 are in electrical contact with the bus conductors 53, the terminal fingers 69 and the conductor fingers 71 are in complete interfitting engagement and surface-to-surface contact as shown in FIG. 4.

Figure 3:
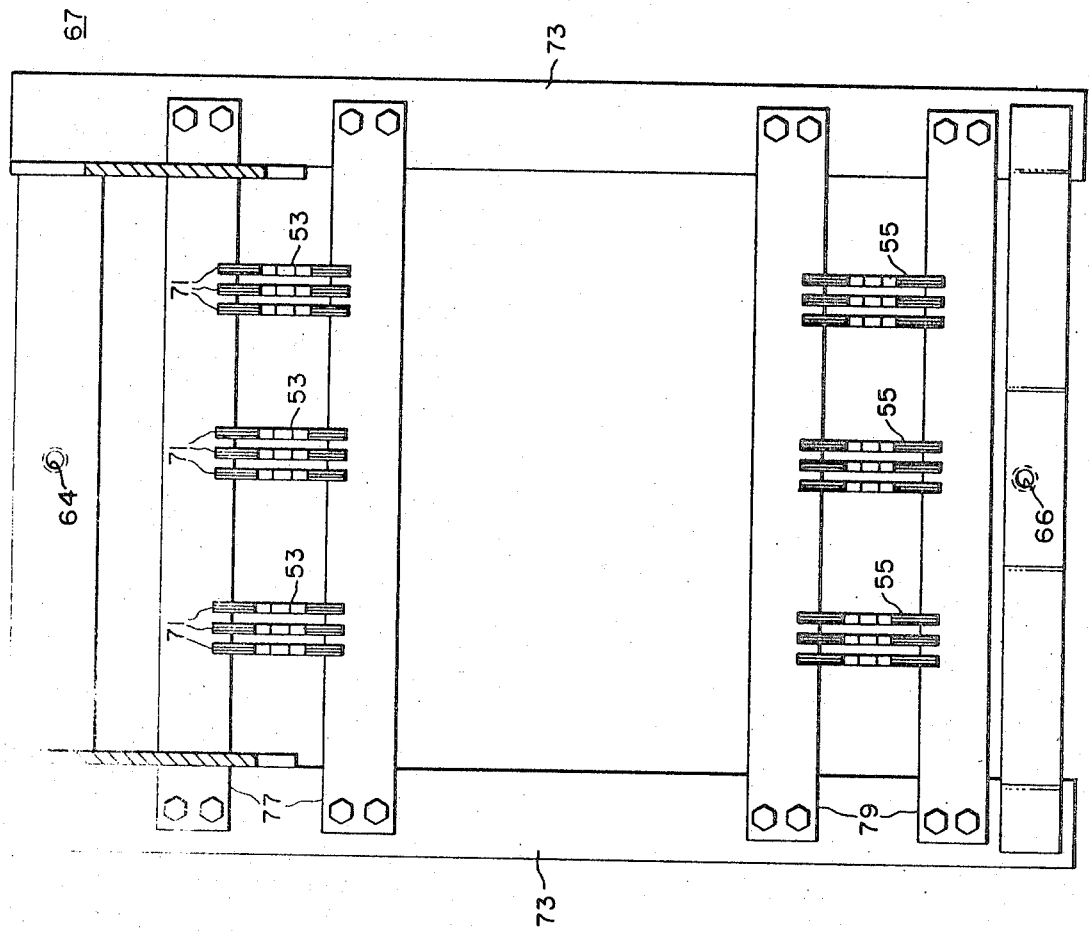
FIG. 3 is a vertical sectional view, taken on the line III—III of FIG. 2.

In FIGS. 2 and 3, the bracket 67 includes a pair of spaced vertical members 73 as well as spaced pairs of mounting bars 77 and 69 on which the spaced bus conductors 53 and 55 are mounted, respectively. The bars 77 and 79 are composed of insulating material. The right ends of the conductors 53 and 55, remote from the frame 67, are electrically connected to load and line conductors in a conventional manner.

As shown in FIG. 4, releasable clamping means, such as a bolt and nut assembly comprising a bolt 81 and a nut 83, are provided for holding the interfitting terminal fingers 69 and conductor fingers 71 in tight surface-to-surface contact to reduce electrical resistance and thereby avoid heat that would be otherwise developed between the interfitting members. For that purpose, the terminal fingers 69 are provided with aligned apertures 85 through which the bolt 81 extends. In FIG. 2, each conductor finger 71 includes a substantially horizontally disposed slots 87 which receive the bolt 81 when the fingers 69 and 71 are assembled as shown in FIG. 4.

In FIG. 4, the bolt 81 includes a head 89 and is assembled in place with a washer 91 at each end together with spacer and insulation means including a pair of flanged sleeves 93, a tubular sleeve 95, and insulating spacers 97 and 99. The sleeves 93, 95 and the spacers 97, 99 are composed of electrically insulating material. The sleeves 93 and 95 insulate the bolt 81 from the several terminal and conductor fingers 69 and 71. The spacers 97 and 99 cooperate with the bolt 81 and nut 83 to clamp the fingers 69 and 71 tightly together in electrically conductive surface-to-surface contact. In addition, spacers 100 may be provided on the bolt adjacent to each terminal structure in order to reserve space on the bolt for additional terminal fingers 69 and conductor fingers 71.

Finally, as shown in FIG. 1, the nuts 83 of the nut and bolt assembly preferably extend slightly beyond opposite side walls of the frame 7 for easy wrench access. The bolt heads 89 are preferably captive and require no wrench. When the assembly is tightened into place, a torque wrench is preferably used to provide a "no-resistance" joint between the fingers 69 and 71. In an alternative embodiment, the nut and bolt assembly may be mounted on the conductor fingers 71 instead of the terminal fingers 69 by providing the conductor fingers with apertures instead of slots 87 and providing the terminal fingers 69 with such slots.

In conclusion, the device of this invention provides for a structure that facilitates assembly and disassembly of conductors both at the line and load ends of a circuit breaker by providing clamping means, which are accessible from the front of the breaker and thereby avoid the necessity of personnel having to enter the rear area of the breaker. Another advantage of frontal accessibility to the lock-in bolts is avoidance of the necessity of turning off the power which is particularly advantageous where other circuit breakers are in use.

What is claimed is:

1. A circuit breaker structure comprising a multipole circuit breaker and spaced bus conductor terminals, each pole for said circuit breaker comprising at least two vertically spaced incoming and outgoing terminals, track means for supporting movement of said circuit breaker terminals in alignment with said corresponding bus conductor terminals, draw-in bolt means operative to initially engage said terminals in closed positions and to finally closed tight electrical contact, said draw-in bolt means comprising screw means for moving said circuit breaker terminals from initial to final tight electrical contact with said bus conductor terminals, and the draw-in bolt means also comprising spaced bolts on said circuit breaker and engagable with bolt-receiving means associated with said bus conductor terminals.

2. The circuit breaker structure of claim 1 in which said bolts aligned with the direction of movement of said circuit breaker with respect to said bus conductor terminals.

3. The circuit breaker structure of claim 1 in which said circuit breaker is mounted on a first frame on which said spaced bolts are rotatably mounted, and said bus conductor terminals are mounted on a second frame having bolt-receiving members.

4. The circuit breaker structure of claim 3 in which said spaced bolts comprise bolt heads that are accessible from said side of the circuit breaker opposite said terminals.

5. The circuit breaker structure of claim 4 in which said bolts are aligned with the direction of movement of said circuit breaker terminals with respect to said bus conductor terminals.

6. The circuit breaker structure of claim 4 in which said first and second terminals are completely interengaged when said bolts are completely seated in said bolt-receiving members.

\* \* \* \* \*